United States Patent [19]

Yamazaki

[11] Patent Number: 4,638,455
[45] Date of Patent: Jan. 20, 1987

[54] FUNCTION DIAGNOSING SYSTEM

[75] Inventor: Etuo Yamazaki, Hachioji, Japan

[73] Assignee: Fanuc Ltd., Minamitsuru, Japan

[21] Appl. No.: 599,617

[22] PCT Filed: Aug. 4, 1983

[86] PCT No.: PCT/JP83/00253
§ 371 Date: Apr. 4, 1984
§ 102(e) Date: Apr. 4, 1984

[87] PCT Pub. No.: WO84/00626
PCT Pub. Date: Feb. 16, 1984

[30] Foreign Application Priority Data

Aug. 5, 1982 [JP] Japan ............... 57-136627

[51] Int. Cl.$^4$ ............................. G06F 11/22
[52] U.S. Cl. ........................ 364/900; 371/20; 371/25
[58] Field of Search ............ 371/25, 16, 20; 323/283, 285; 364/200 MS File, 900 MS File

[56] References Cited

U.S. PATENT DOCUMENTS

| | | | |
|---|---|---|---|
| 4,063,081 | 12/1977 | Handly et al. | 371/16 |
| 4,143,283 | 3/1979 | Graf et al. | 364/900 |
| 4,146,832 | 3/1979 | McConnell | 323/285 |
| 4,190,795 | 2/1980 | Schultheis | 323/285 |
| 4,251,883 | 2/1981 | Grants et al. | 371/16 |
| 4,257,098 | 3/1981 | Lacy | 364/200 |
| 4,282,583 | 8/1981 | Khan | 364/900 |
| 4,315,311 | 2/1982 | Causse et al. | 371/16 |
| 4,323,958 | 4/1982 | Nowell | 323/283 |
| 4,497,058 | 1/1985 | Kato et al. | 371/16 |
| 4,535,456 | 8/1985 | Bauer et al. | 371/16 |

Primary Examiner—David Y. Eng
Attorney, Agent, or Firm—Staas & Halsey

[57] ABSTRACT

The present invention is to permit automatic regulation of a malfunctioning part of a device which operates in accordance with a command program. In a program memory (M2) is stored a diagnostic program which is started when making a function diagnosis of the device, and upon detection of a diagnostic instruction inserted in the command program, a control unit (CPU) starts the diagnostic program to make the function diagnosis of the device and, at the same time, controls a regulating device (S1 to S4) provided for each block of the device so that the level of an output signal of each block may become a predetermined level.

2 Claims, 4 Drawing Figures

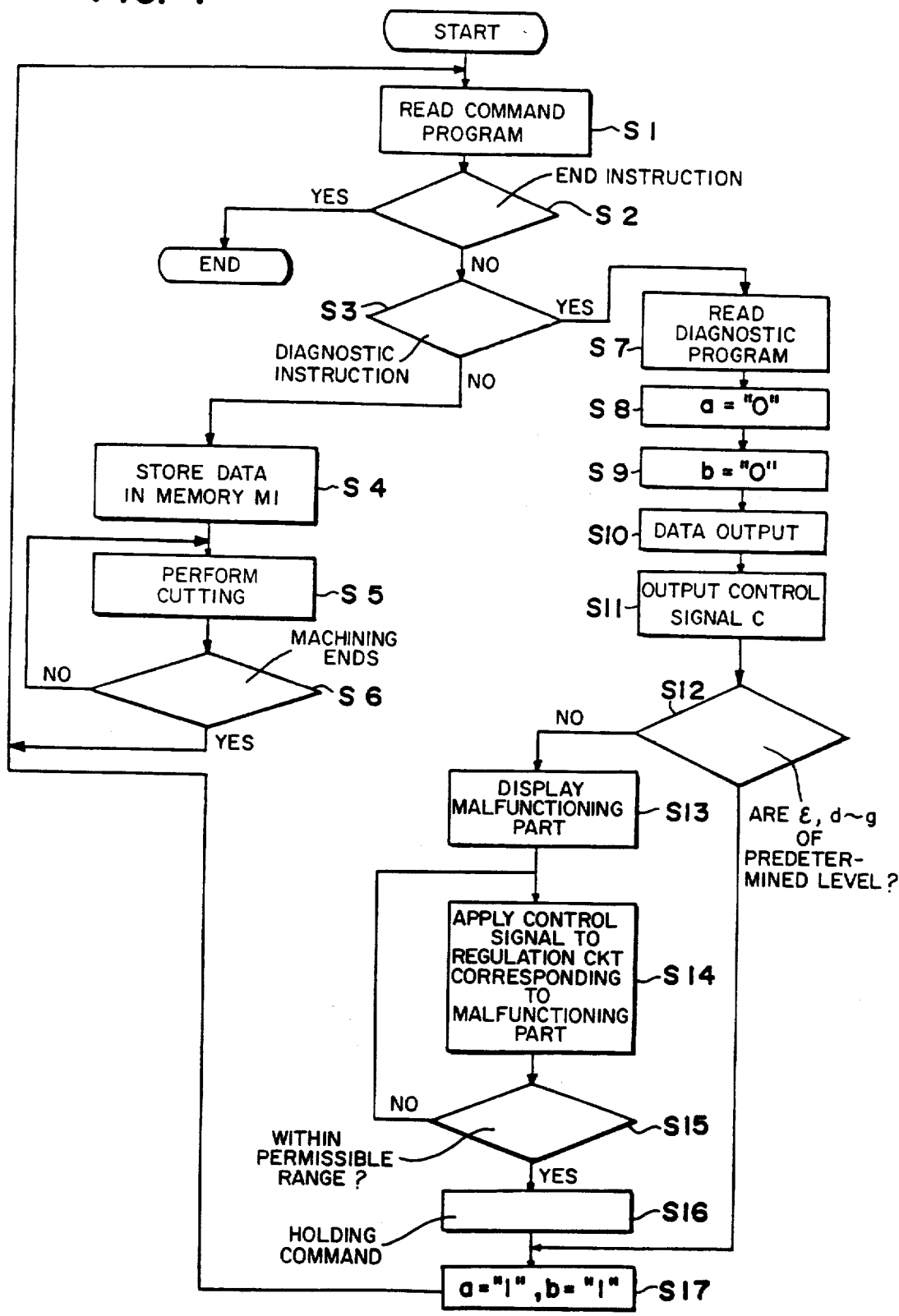

FUNCTION DIAGNOSING SYSTEM

CROSS REFERENCES TO RELATED APPLICATIONS

This application is related to the U.S. application having Ser. No. 599,616 by the same inventor and assigned to the assignee of the present invention, now abandoned.

The present invention relates to a function diagnosing system for diagnosing functions of devices which operate in accordance with command programs, such as a machine tool and the like, and more particularly to a function diagnosing system which permits automatic detection and regulation of a malfunctioning part.

It is customary in the prior art that when a malfunction occurs in a machine tool or the like which operates in accordance with a command program, maintenance personnel test each part of the device using a measuring instrument to detect and regulate an affected part. Therefore, the prior art method is defective in that much time is consumed for detecting and regulating the malfunctioning part.

SUMMARY OF THE INVENTION

The present invention is to obviate such a defect of the prior art and has for its object permitting the detection of a malfunctioning part in a short time and automatic regulation of the affected part.

The present invention is provided with a memory for storing a diagnostic program which is started when diagnosing a function of a device, regulating means, each provided corresponding to one of blocks of the device, for regulating the level of an output signal of the block, and a control unit for controlling the operation of the device. Upon detection of a diagnostic instruction inserted into the diagnostic program, the control unit starts the diagnostic program to diagnose the function of the device and controls the regulating means so that the level of the output signal of each block of the device becomes a predetermined level; therefore, each part of the device can easily be adjusted.

BRIEF DESCRIPTION OF THE DRAWINGS

FIG. 4 is a flowchart showing the contents of processing by the control unit.

DESCRIPTION OF THE PREFERRED EMBODIMENTS

Figure 1:
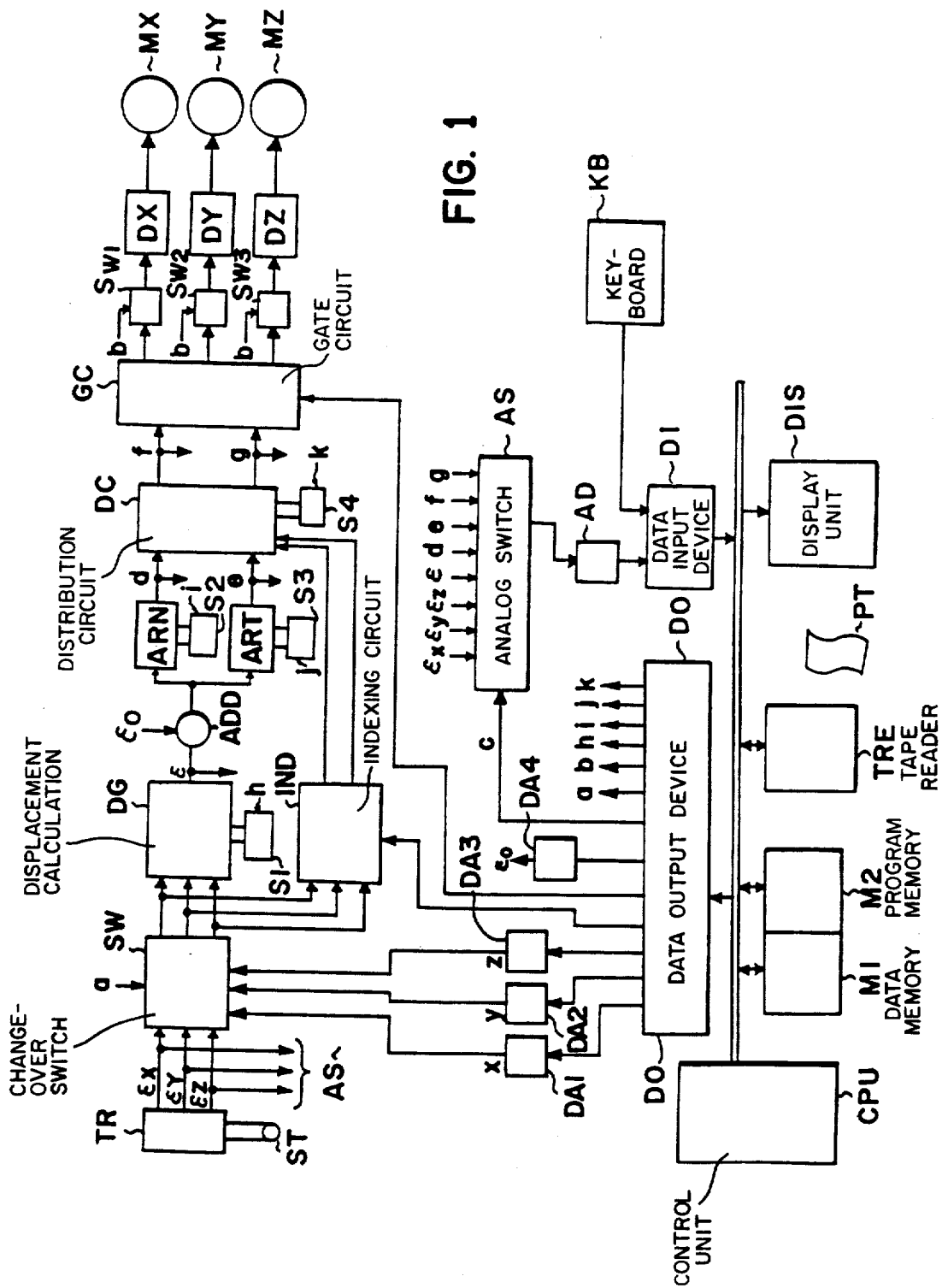
FIG. 1 is a block diagram illustrating an embodiment of the present invention.

FIG. 1 is a block diagram illustrating an embodiment of the present invention as being applied to a tracing machine. In FIG. 1, reference character TR indicates a tracer head, ST a stylus, SW a changeover switch which when a control signal a applied thereto via a data output device DO is a "1", provides displacement signals $\epsilon_x$, $\epsilon_y$ and $\epsilon_z$ from the tracer head TR to a displacement calculation circuit DG and an indexing circuit IND. When the control signal a is a "0", the changeover switch SW provides output signals x, y and z of DA converters DA1 to DA3 to the displacement calculation circuit DG and the indexing circuit IND, instead of applying the displacement signals $\epsilon_x$, $\epsilon_y$ and $\epsilon_z$. ADD is an adder, ARN and ART velocity component calculation circuits, DC a distribution circuit, GC a gate circuit, DX, DY and DZ servo amplifiers, and MX, MY and MZ motors. AS is an analog switch, AD an AD converter, DI a data input device, CPU a control unit, and SW1 to SW3 switches each of which is turned ON when a control signal b applied thereto via the data output device DO is a "1" and is turned OFF when the control signal b is a "0". DIS is a display unit, TRE a tape reader, KB a keyboard, and M1 a data memory in which are stored data such as two-way tracing, one-way tracing, contour tracing and other tracing modes, a tracing direction, a tracing speed, a pick feed value and so forth. M2 is a program memory in which are stored a control program and a diagnostic program, and S1 to S4 are regulation circuits which respond to regulation control signals h to k applied thereto via the data output device DO to regulate the levels of the output signals $\epsilon$ and d to g of the displacement calculation circuit DG, the velocity component calculation circuits ARN and ART and the distribution circuit DC.

The stylus ST is brought into contact with a model (not shown) and is fed by the motors, and the displacement signals $\epsilon_x$, $\epsilon_y$ and $\epsilon_z$ corresponding to the displacement of the stylus ST are provided from the tracer head TR. Based on the displacement signals $\epsilon_x$, $\epsilon_y$ and $\epsilon_z$ applied thereto via the changeover switch SW, the displacement calculation circuit DG produces a composite displacement signal $\epsilon = \sqrt{\epsilon_x^2 + \epsilon_y^2 + \epsilon_z^2}$, and the indexing circuit IND produces displacement-direction signals $\sin\theta$ and $\cos\theta$. The composite displacement signal $\epsilon$ is provided to the adder ADD to obtain the difference between it and a reference displacement signal $\epsilon_0$. In the velocity component calculation circuits ARN and ART, a normal-direction velocity signal c and a tangential-direction velocity signal d are obtained. In the distribution circuit DC, command velocity signals e and f are produced on the basis of the displacement-direction signals $\sin\theta$ and $\cos\theta$, the normal-direction velocity signal c and the tangential-direction velocity signal d. The command velocity signals are provided to that one of the servo amplifiers which is selected by the gate circuit GC, bodily feeding the stylus and a cutter (not shown). Since these operations are well-known in the tracer control technology, no more detailed description will be given.

Figure 2:
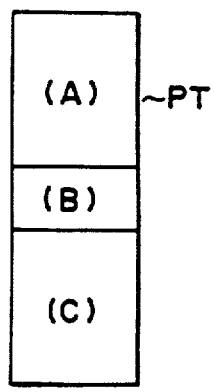
FIG. 2 is a diagram showing, by way of example, the contents of a command tape.

FIG. 2 is a diagram showing, by way of example, the contents of a command tape PT for use in carrying this invention system into practice, (A) indicating a command program which controls roughing, (B) a diagnostic instruction for a starting the diagnostic program stored in the program memory M2 and (C) a command program which controls finishing. FIG. 4 is a flowchart showing the contents of processing by the control unit.

The control unit CPU reads the part (A) of the command tape PT, using the tape reader TRE (step S1), and when it determines that the instruction thus read out is not an end instruction (step S2) nor is it a diagnostic instruction (step S3), stores in the data memory M1 data (a reference displacement value, a pick feed value, a pick feed direction, a pick feed speed, etc.) stored in the readout part (step S4), and then performs tracer control (roughing) in accordance with the data stored in the data memory M1 and a control program stored in the program memory M2 (step S5). When it determines that the roughing has come to an end (step S6), the control unit CPU reads the part (B) of the command tape PT, using the tape reader TRE (step S1), and when it determines that the instruction read out is the diagnostic instruction (step S3), reads the diagnostic program stored in the program memory M2 (step S7) and then diagnoses the function of each part of the device in accordance with the diagnostic program.

The function of each part of the device is diagnosed, for example, in a manner such as follows: The control unit CPU first makes the input control signal a applied via the data output device DO to the input changeover switch SW a "0" (step S8), then makes the output control signal b applied to each of the switches SW1 to SW3 a "0" (step S9) and then provides predetermined data via the data output device DO to the DA converters DA1 to DA3 (step S10). Since the changeover switch SW is one that, while the control signal a is a "0", provides the output signals (diagnostic input signals) x, y and z from the DA converters DA1 to DA3 to the displacement calculation circuit DG and the indexing circuit IND, instead of applying the displacement signals $\epsilon_x$, $\epsilon_y$ and $\epsilon_z$, as referred to previously, each part of the device performs an operation based on the output signals x, y and z of the DA convertors DA1 to DA3, and the output signal $\epsilon$ of the displacement calculation circuit DG, the output signals d and e of the velocity component calculation circuits ARN and ART and the output signals f and g of the distribution circuit DC are provided to the analog switch AS. Furthermore, since the switches SW1 to SW3 are each turned OFF while the control signal b is a "0", as mentioned previously, the motors MS, MY and MZ are out of operation during the period.

Next, the control unit CPU provides a control signal c via the data output device DO to the analog switch AS (step S11), applying the signals $\epsilon$ and d to g output from respective parts of the device via the AD converter AD to the data input device DI in a sequential order. The control unit CPU determines whether the levels of the signals $\epsilon$ and d to g sequentially applied via the data input device DI are predetermined levels or not (step S12).

Figure 3:
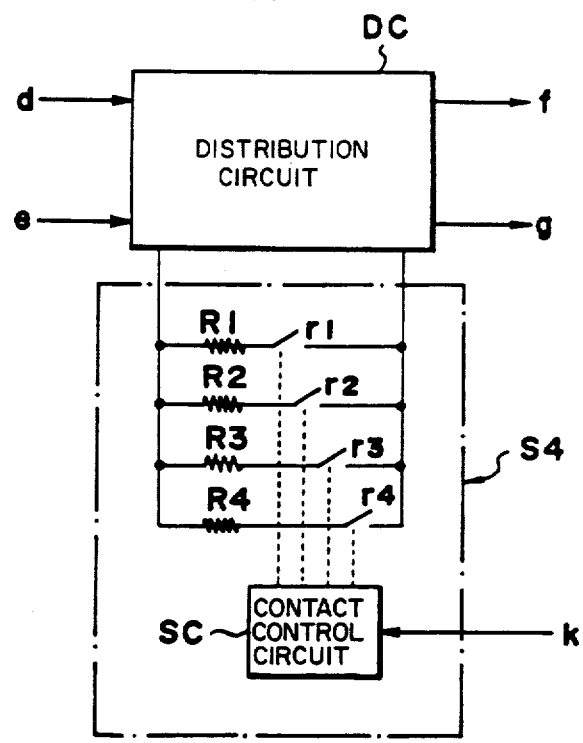
FIG. 3 is a block diagram illustrating the arrangement of a regulation circuit.

When it determines that the levels of the signals, for instance, f and g among the signals $\epsilon$ and d to g are not the predetermined levels, the control unit CPU decides that a failure has occurred in the distribution circuit DC, and provides a display to that effect on the display unit DIS (step S13) and, at the same time, provides a regulation control signal k via the data output device DO to the regulation circuit S4 having an arrangement as shown in FIG. 3. In FIG. 3, reference character SC indicates a contact control circuit which responds to the control signal k to effect ON-OFF control of contacts r1 to r4, and R1 to R4 resistors weighted, for example, 1, 2, 4 and 8, respectively. Incidentally, the regulation circuits S1 to S3 are also of the same construction as mentioned above. The above-said operation will be described in more detail. When it determines that the signals f and g are not of predetermined levels, the control unit CPU applies the control signal k to the contact control circuit SC in the regulation circuit S4 (step S14), switching the states of the contacts r1 to r4 in a sequential order. When the difference between the levels of the signals f and g and the predetermined levels have come into a permissible range, the control unit CPU instructs the contact control circuit SC to hold the states of the contacts r1 to r4 at that time (step S16), then makes each of the control signals a and b a "1" (step S17) and then reads the part (C) of the command tape PT (step S1). When it determines that this part is not the end instruction (step S2) nor is it the diagnostic instruction (step S3), the control unit CPU stores the data of the part (C) in the data memory M1 (step S4) and performs tracer control (finishing) in accordance with the data stored in the data memory M1 and the control program stored in the program memory M2 (step S5). In the case where the levels of the signals f and g cannot be made as predetermined in spite of switching of the resistors R1 to R4 in the regulation circuit S4, the control unit CPU provides a display to that effect on the display unit DIS. Among the trouble that can be corrected by switching the resistors R1 to R4 in the regulation circuit S4, there are for example abnormalities in output levels which result from variations in the power supply voltage and ambient temperature.

Moreover, when it determines that the levels of the signals $\epsilon$ and d to g are all as predetermined (step S12), the control unit CPU first makes each of the control signals a and b a "1" (step S17) and then reads the part (C) of the command tape, using the tape reader TRE (step S1), performing tracer control (finishing) in the same manner as described previously.

While in the embodiment the diagnostic instruction is inserted between the command program for roughing and the command program for finishing, it is a matter of course that the diagnostic instruction may also be inserted at a desired position without being limited specifically to the above position.

As has been described in the foregoing, according to the present invention, a device is divided into a plurality of blocks, regulating means (regulation circuits S1 to S4 in the embodiment) for regulating the levels of output signals of the respective blocks are provided corresponding thereto, and when diagnosing the functions of the device, the regulating means are controlled so that the output signals of the respective blocks may become predetermined levels; accordingly, the invention possesses the advantage of permitting easy regulation of each part of the device.

What is claimed is:

1. An automatic regulation system for a machine controller that includes an input, an output and regulatable and testable functional units and produces output signals for controlling a machine, said system comprising:

control means, operatively connected to the machine controller and responsive to a prestored diagnostic instruction, for causing each functional unit of said machine controller to produce diagnostic output signals and producing regulation control signals for each functional unit for correcting the diagostic output signals; and regulating means, operatively connected to said control means and the machine controller, for regulating and fixing the levels of the diagnostic output signals in dependence upon the regulation control signals to correct the diagnostic output signals, so that the machine controller produces the output signals at predetermined levels, and said control means comprising:

a control computer, operatively connected to the machine controller, for controlling the machine controller in dependence upon a command program having a diagnostic instruction, said control computer generating diagnostic input signals and input/output control signals and when the diagnostic instruction is executed, said control computer generating regulation control signals for the regulating means in dependence upon the diagnostic output signals to adjust the diagnostic output signals to predetermined levels, thereby adjusting the levels of the machine controller output control signals;

an input switch, operatively connected to said control computer, the machine and the input of the machine controller, for disconnecting the input to the machine controller from the machine and connecting the diagnostic input signals to the machine controller in dependence upon the input control signal;

an output switch, operatively connected to said control computer, the machine and the output of the machine controller, for disconnecting the output of the machine controller to the machine in dependence upon the output control signal; and an analog switch, operatively connected to the machine controller and said control computer, for connecting the diagnostic output signals to said control computer.

2. An automatic regulation system as recited in claim 1, wherein said regulating means comprises:

a contact control circuit operatively connected to said control computer to receive the regulation control signals; and a resistor network, operatively connected to said contact control circuit and the machine controller, providing a variable resistance to the machine controller as controlled by said contact control circuit in dependence upon the regulation control signals.

* * * * *